United States Patent [19]

Nagata et al.

[11] Patent Number: 5,095,397
[45] Date of Patent: Mar. 10, 1992

[54] THIN FILM MAGNETIC HEAD OF EMBODIED RECORDING AND REPRODUCING TRANSDUCER TYPE

[75] Inventors: Yuji Nagata, Yao; Toshio Fukazawa, Kyoto; Satoru Mitani, Hirakata, all of Japan

[73] Assignee: Matsushita Electric Industrial Co., Ltd., Osaka, Japan

[21] Appl. No.: 559,065

[22] Filed: Jul. 30, 1990

[30] Foreign Application Priority Data

Aug. 4, 1989 [JP] Japan .................................. 1-203305

[51] Int. Cl.⁵ ............................................. G11B 5/17
[52] U.S. Cl. ................................. 360/113; 360/126; 360/119; 360/122; 360/125
[58] Field of Search ........ 360/113, 110, 122, 126–127, 360/125, 119

[56] References Cited

U.S. PATENT DOCUMENTS

| 4,566,050 | 1/1986 | Beam et al. | 360/113 |
|---|---|---|---|
| 4,635,227 | 1/1987 | Normann | 360/122 |
| 4,789,910 | 12/1988 | Otsuka et al. | 360/113 |
| 4,802,043 | 1/1989 | Sato et al. | 360/113 |
| 4,816,947 | 3/1989 | Vinal et al. | 360/113 |
| 4,881,143 | 11/1989 | Bhattacharyya et al. | 360/113 |
| 4,885,649 | 12/1989 | Das | 360/113 |
| 4,935,832 | 6/1990 | Das et al. | 360/113 |
| 4,954,920 | 9/1990 | Yamada et al. | 360/113 |

FOREIGN PATENT DOCUMENTS

| 52-12814 | 1/1977 | Japan . | |
|---|---|---|---|
| 60-50612 | 3/1985 | Japan | 360/113 |
| 61-48116 | 3/1986 | Japan . | |
| 61-196418 | 8/1986 | Japan | 360/113 |
| 61-276110 | 12/1986 | Japan | 360/113 |
| 62-43813 | 2/1987 | Japan | 360/113 |
| 62-92215 | 4/1987 | Japan | 360/113 |
| 62-92218 | 4/1987 | Japan | 360/113 |
| 1-138608 | 5/1989 | Japan | 360/113 |
| 1-307008 | 12/1989 | Japan | 360/113 |
| 2-105307 | 4/1990 | Japan | 360/113 |
| 8807741 | 10/1988 | PCT Int'l Appl. | 360/113 |

*Primary Examiner*—Aristotelis Psitos
*Assistant Examiner*—Alfonso Garcia
*Attorney, Agent, or Firm*—Stevens, Davis, Miller & Mosher

[57] ABSTRACT

There is disclosed a thin film magnetic head which requires less recording current, and is capable of recording and reproducing with a high sensitivity. To achieve this magnetic head, a third yoke of a high permeability is bridged across a notched portion of a second yoke between front and back portions of the second yoke constituting part of a magnetic circuit. With this construction, the third yoke serves to extremely reduce a magnetic resistance between the front and back portions of the second yoke, so that the recording current can be smaller, thereby enhancing the recording efficiency.

10 Claims, 4 Drawing Sheets

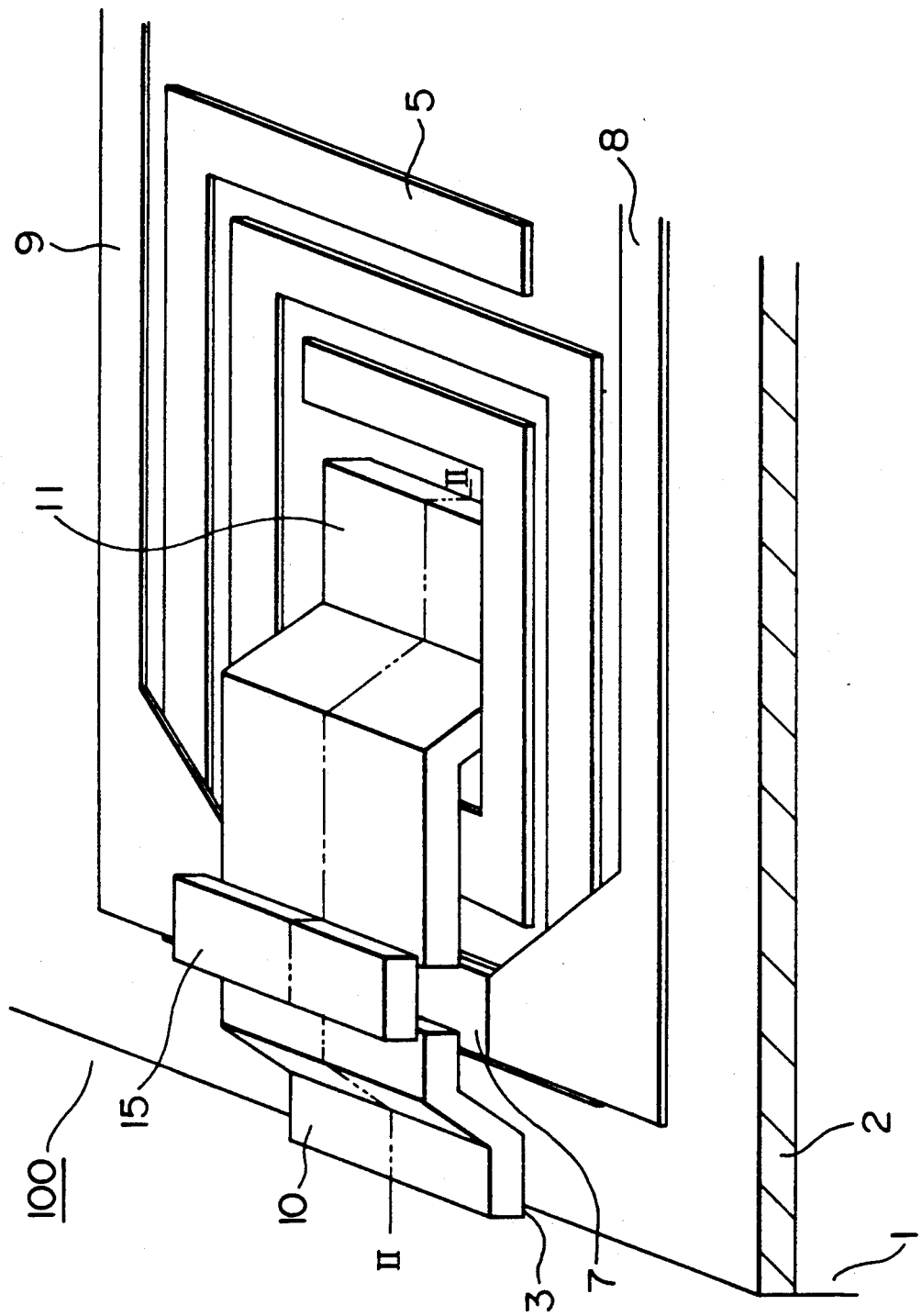

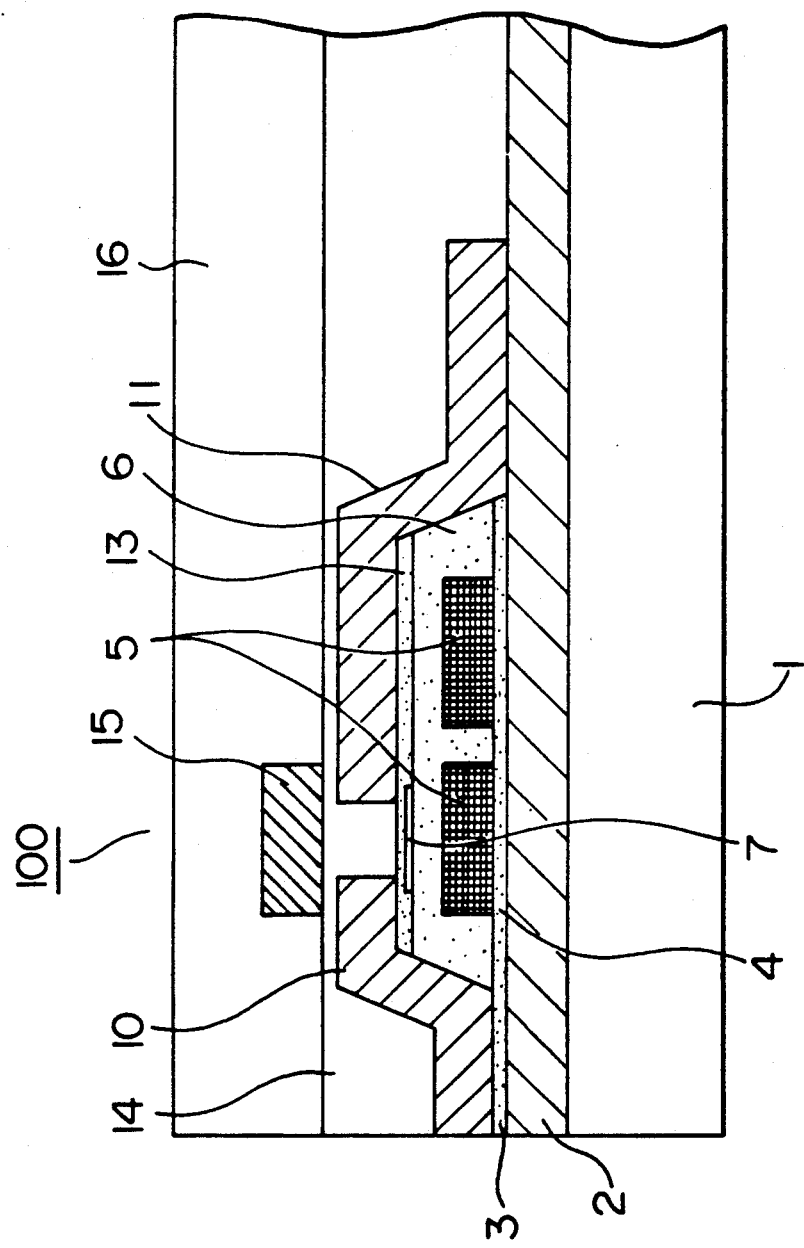

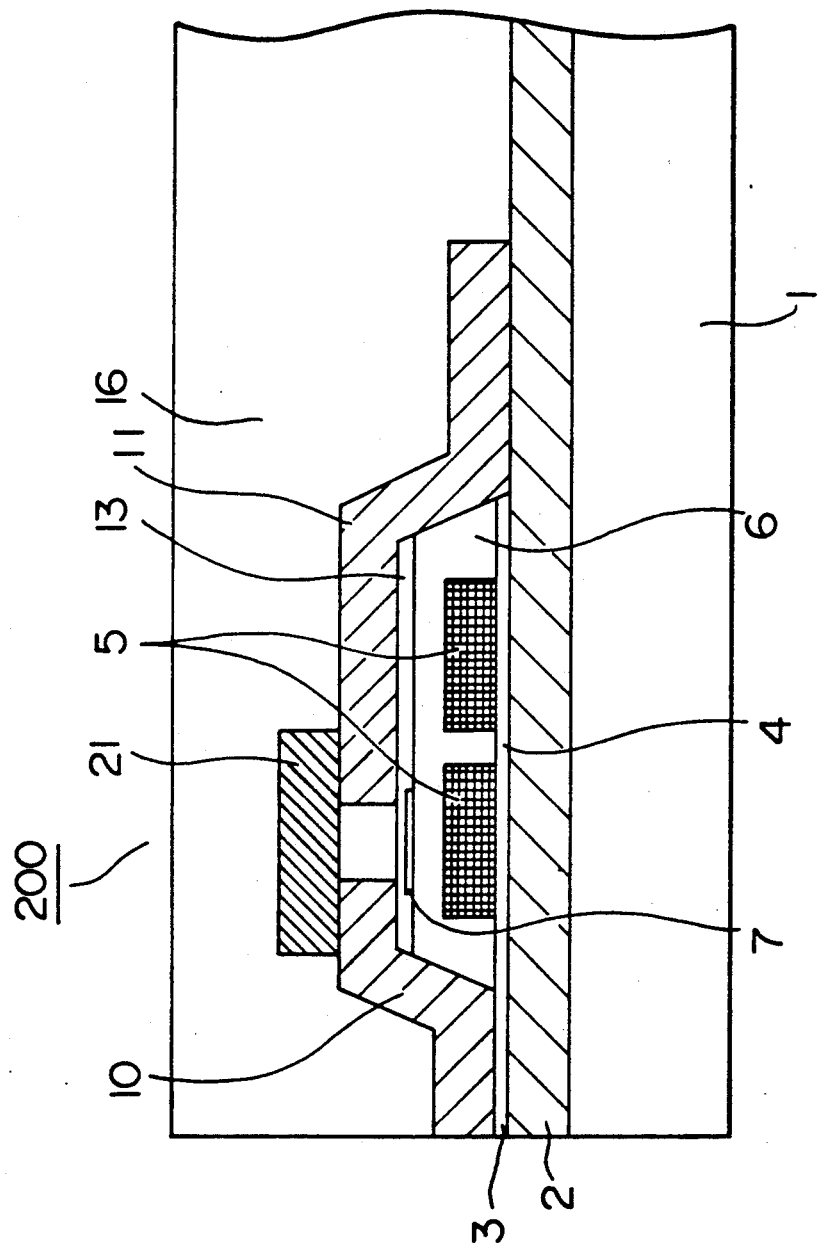

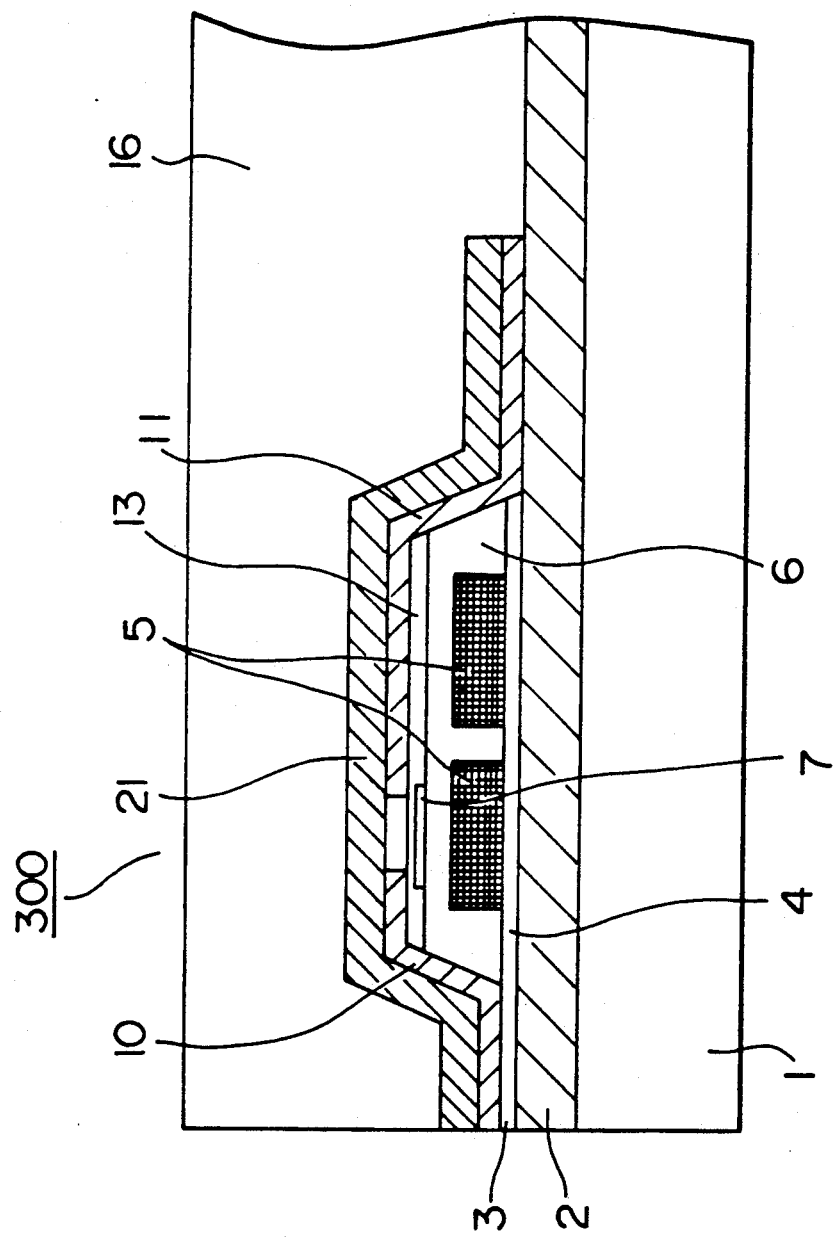

THIN FILM MAGNETIC HEAD OF EMBODIED RECORDING AND REPRODUCING TRANSDUCER TYPE

BACKGROUND OF THE INVENTION

1. Field of the Invention

This invention relates generally to a thin film magnetic head for use in a magnetic recording apparatus and more particularly to a thin film magnetic head which is formed as a whole by a recording and reproducing transducing head and is provided with a single read-write gap commonly used.

2. Description of the Prior Art

A conventional coil-type magnetic head produces a reproducing output proportional to the running speed of a recording medium. On the other hand, a thin film magnetic head uses a magneto resistance effect and produces a constant reproducing output irrespective of a relative speed between the magnetic head and the recording medium. Therefore a high reproducing output is available even under the condition of a low relative speed. For this reason, recently, thin film magnetic heads of this type have been extensively used in magnetic recording apparatus. However, the thin film magnetic head of the magneto resistance effect type has no recording ability, and therefore in order for the magnetic head to have both recording and reproducing functions, it has been necessary that such a head be combined with a coil-type inductive thin film magnetic head. Such a magnetic head is already known, for example, from Japanese Patent Unexamined Publication Nos. 52-12814 and 61-48116.

In a conventional thin film magnetic head, a lower magnetic layer and an upper magnetic layer both extending straight are disposed in opposed relationship to each other on a substrate. The lower and upper magnetic layers cooperate with a magnetic gap, formed between these magnetic layers, to provide a magnetic circuit. A coil layer is formed in interlinking relation such a chain to the magnetic circuit. The upper magnetic layer is divided into two portions, i.e., front and rear (back) portions, and a magneto resistive element is provided to bridge the front and rear portions.

This conventional thin-film magnetic head has a first yoke formed on a substrate, a second yoke formed so as to constitute a reading and writing gap on one end of the first yoke, a third yoke formed so as to be connected to the first yoke at the other end thereof, a coil formed so as to cross to a magnetic circuit constituted by the first yoke, the second yoke, the third yoke and the writing and reading gap, and a magneto resistive element formed to bridge the second and third yokes.

The operation of this thin film magnetic head will now be described. At the time of recording, recording current flows through the coil layer, so that a recording magnetic field leaks from the magnetic gap to the exterior. The recording onto the recording medium is effected by this magnetic field.

At the time of reproducing, a signal flux generated from the recording medium flows into the magneto resistive element from the magnetic gap via the second yoke. The signal is sensed by variations in resistance of the magneto resistive element. Namely, drive current is applied to the magneto resistive element, and the resistance variation in the magneto resistive element is converted into a voltage, and signal reading is effected.

However, in such a conventional thin film magnetic head, a magnetic resistance is large at a dividing portion between the second yoke and the third yoke. This results in a disadvantage that the recording current required for recording signals on the recording medium is quite large. The increase of the recording current increases the size of a circuit for driving the thin film magnetic head, and therefore this is a factor in the failure to provide a compact or small-size construction of the magnetic recording apparatus. Also, the increase of the recording current raises the temperature of the thin film magnetic head, and therefore this is a factor in the deterioration of the durabilities of the thin film magnetic head and the magnetic recording medium.

SUMMARY OF THE INVENTION

With the above problems of the prior art in view, it is an object of this invention to provide a thin film magnetic head which is capable of recording and reproducing with a high sensitivity.

This object of the invention has been achieved by a thin film magnetic head in which a fourth yoke of a high permeability is formed so as to bridge across a portion between the second yoke and the third yoke constituting part of a magnetic circuit. With this construction, the fourth yoke serves to greatly reduce a magnetic reluctance between the second and third yokes, so that the recording current can be smaller, thereby enhancing the recording efficiency.

BRIEF DESCRIPTION OF THE DRAWINGS

FIG. 1 is a schematic perspective view of a magnetic head having a recording/writing transducer according to one preferred embodiment of the present invention;

FIG. 2 is a cross-sectional view taken along the line II—II of FIG. 1;

FIG. 3 is a cross-sectional view of a portion of a thin film magnetic head according to a second embodiment of the present invention; and FIG. 4 is a cross-sectional view of a portion of a having a recording/writing transducer magnetic head according to a third embodiment of the invention.

DESCRIPTION OF THE PREFERRED EMBODIMENTS OF THE INVENTION

A having a recording/writing transducer magnetic head 100 according to a preferred embodiment of the invention will now be described with reference to the structures shown in FIGS. 1 and 2. A first yoke 2 of a soft magnetic material, such as permalloy and Sendust, is formed by sputtering process on a substrate 1 of a non-magnetic material such as ceramics and glass. A first insulating layer 4 made of an insulating material (i.e., $SiO_2$) is formed on an upper surface of the first yoke 2, with part of the first insulating layer 4 serving as a read-write gap 3. A coil layer 5 and a second insulative layer 6 are formed on the first insulating layer 4 by sputtering process or the like. A magneto resistive element 7, made of a nickel-iron alloy, and electrodes 8 and 9 are formed on the second insulating layer 6. A second yoke 10 and a third yoke 11 are formed over the magneto resistive element 7 on a third insulative layer 13, the second yoke 10 and third yoke 11 being made of permalloy, Sendust or the like. A non-magnetic layer 14 is formed on the second yoke 10, the third yoke 11 and fourth yoke 15 of a soft magnetic material is formed to bridge the second and third yoke 10 and 11. Reference numeral 16 denotes a protective layer made of an alumina film.

The operation of the thin film magnetic head 100 will now be described.

At the time of recording, write current is applied to the coil 5 to generate a recording magnetic field which is fed to the read-write gap 3 via a magnetic circuit constituted by the third yoke 11, the fourth yoke 15, the second yoke 10 and the first yoke 2, so that the signal is written onto a recording medium. Because of the provision of the fourth yoke 15, a magnetic resistance between the second and third yokes 10 and 11 at the time of recording is very small. Therefore, the recording efficiency of the magnetic head of this embodiment can be improved so as to provide an efficiency several times higher than that of a conventional thin film magnetic head not provided with such fourth yoke.

At the time of reproducing, a signal flux from the recording medium flows into the magneto resistive element 7 via the second yoke 10. At this time, part of the signal flux also flows into the fourth yoke 15. However, because of the provision of the fourth yoke 15, the overall magnetic reluctance of the magnetic need is reduced, and the amount of the signal flux flowing into the magnetic head from the recording medium is markedly increased. Therefore, the amount of the magnetic flux flowing into the magneto resistive element 7 is generally equal to that achieved with the conventional magnetic head. Therefore, the composite-type thin film magnetic head of this embodiment has generally an equivalent reproducing sensitivity in comparison with that of the conventional magnetic head.

Such effects can also be obtained when the fourth yoke 15 is so formed as to be in direct contact with the third yoke 11.

By forming the second yoke 10, third yoke 11 and the fourth yoke 15 from the same soft magnetic material, the steps of the manufacturing process can be reduced.

FIG. 3 is a view similar to FIG. 2, but showing a thin film magnetic head 200 according to a second embodiment of the present invention. In this embodiment, a fourth yoke 21 is formed in such a manner that it is connected directly to the upper portion of the second yoke 12. The third yoke 21 is made of such a material that the coercive force of the magnetic material for the fourth yoke 21 is greater than the coercive force of the magnetic material for the second yoke 10 and third yoke 11.

The operation of the thin film magnetic head 200 of the second embodiment will now be described.

At the time of recording, as in the first embodiment of FIG. 1, a recording magnetic field is fed to the read-write gap 3 via a magnetic circuit constituted by the third yoke 11, the fourth yoke 21, the second yoke 10 and the first yoke 2, so that the signal is recorded onto the recording medium.

The reproducing in the second embodiment differs from that of the first embodiment. Namely, a signal magnetic flux from the recording medium flows into the magneto resistive element 7 and the fourth yoke 21 via the second yoke 10. At this time, most of the signal magnetic flux flows into the magneto resistive element 7. The reason for this is that since the fourth yoke 21 is made of a soft magnetic material having a large coercive force, the fourth yoke 21 hardly allows a weak magnetic flux to pass during the reproducing. Therefore, the thin film magnetic head of this embodiment has generally the same reproducing sensitivity as the conventional magnetic head.

FIG. 4 is a sectional view similar to FIG. 2, but showing a thin film magnetic head 300 according to a fourth embodiment of the present invention. A third yoke 21 is formed in such a manner that it is extended to the read-write gap 3. In this case, since a recording magnetic field passes through the fourth yoke 21 and reaches the read-write gap 3, the recording efficiency is further improved. Also, the film thickness of the second yoke 10 and third yoke 11 can be reduced, and this simplifies the manufacturing process of the thin film magnetic head.

In the above three embodiments, although the first yoke 2 is formed on the non-magnetic substrate, the substrate may be made of a magnetic material, in which case this magnetic substrate can be used as the first yoke.

What is claimed is:

1. A thin film magnetic head of an embodied recording and reproducing transducer type, comprising:
   a first yoke of a soft magnetic material;
   a second yoke of a soft magnetic material and having opposite ends, said second yoke cooperating at one end thereof with said first yoke to provide a read-write gap therebetween;
   a third yoke of a soft magnetic material magnetically connected at one end thereof adjacent said read-write gap to said first yoke;
   a fourth yoke of a sift magnetic material and a magneto resistive element formed to bridge between said second yoke and said third yoke;
   current supply means for supplying drive current to said magneto resistive element; and
   a coil disposed around a magnetic circuit constituted by said first yoke, said second yoke, said third yoke, said fourth yoke and said read-write gap.

2. A thin film magnetic head of an embodied recording and reproducing transducer type, comprising:
   a first yoke of a soft magnetic material;
   a second yoke of a soft magnetic material and having opposite ends, said second yoke cooperating at one end thereof with said first yoke to provide a read-write gap therebetween;
   a third yoke of a soft magnetic material magnetically connected at one end thereof adjacent said read-write gap to said first yoke;
   a magneto resistive element disposed beneath at least a part of said second yoke and said third yoke;
   a fourth yoke of a soft magnetic material magnetically connected to at least a part of said second yoke and said third yoke and including a non-magnetic layer formed as an intermediate layer;
   current supply means for supplying drive current to said magneto resistive element; and
   a coil disposed around a magnetic circuit constituted by said first yoke, said second yoke, said third yoke, said fourth yoke and said read-write gap.

3. A thin film magnetic head according to claim 1, in which said second yoke, said third yoke and said fourth yoke are made of the same soft magnetic material.

4. A thin film magnetic head according to claim 1, in which said fourth yoke is greater in coercive force than said second yoke and said third yoke.

5. A thin film magnetic head according to claim 4, in which said fourth yoke is formed to be connected directly to at least a part of said second yoke and said third yoke.

6. A thin film magnetic head according to claim 5, in which said third yoke is formed so as to be extended to said read-write gap.

7. A thin film magnetic head according to claim 2, in which said second yoke, said third yoke and said fourth yoke are made of the same soft magnetic material.

8. A thin film magnetic head according to claim 2, in which said fourth yoke is greater in coercive force than said second yoke and said third yoke.

9. A thin film magnetic head according to claim 8, in which said fourth yoke is formed to be connected directly to at least part of said second yoke and said third yoke.

10. A thin film magnetic head according to claim 9, in which said third yoke is formed so as to be extended to said read-write gap.

* * * * *